US005138345A

United States Patent [19]

Tohyama et al.

[11] Patent Number: 5,138,345
[45] Date of Patent: Aug. 11, 1992

[54] METHOD AND APPARATUS FOR SUPPLYING A SUBSTANCE BETWEEN ELECTRODES, THE VISCOUS ADHESIVENESS OF WHICH IS REDUCED AT ONE ELECTRODE TO ATTACH A VARIABLE AMOUNT OF SUBSTANCE TO THE OTHER ELECTRODE ACCORDING TO THE DURATION OF AN APPLIED PULSE VOLTAGE

[75] Inventors: Noboru Tohyama, Kawasaki; Motokazu Kobayashi, Yokohama; Kenichi Matsumoto, Tokyo, all of Japan

[73] Assignee: Canon Kabushiki Kaisha, Tokyo, Japan

[21] Appl. No.: 554,897

[22] Filed: Jul. 20, 1990

[30] Foreign Application Priority Data

Jul. 21, 1989 [JP] Japan .................................. 1-190188
Jul. 21, 1989 [JP] Japan .................................. 1-190189

[51] Int. Cl.$^5$ ........................ B41M 5/00; B41M 5/20; G01D 15/16; B41J 2/005

[52] U.S. Cl. ................................ 346/140 R; 101/465; 101/466; 101/489; 101/DIG. 37; 346/1.1

[58] Field of Search ............................ 346/140 R, 1.1; 101/489, 465, 466, DIG. 37, 478

[56] References Cited

U.S. PATENT DOCUMENTS

| | | | |
|---|---|---|---|
| 3,946,671 | 3/1976 | Mitcalfe | 101/489 |
| 4,359,748 | 11/1982 | Pasini | 346/140 R |
| 4,368,669 | 1/1983 | Love | 346/140 R |
| 4,833,990 | 5/1989 | Hirt | 101/DIG. 37 |
| 4,881,084 | 11/1989 | Kan et al. | 346/1.1 |
| 4,962,389 | 10/1990 | Kan et al. | 346/140 R |
| 4,972,200 | 11/1990 | Arahara et al. | 346/1.1 |
| 5,041,843 | 8/1991 | Tohyama et al. | |

*Primary Examiner*—Benjamin R. Fuller
*Assistant Examiner*—Scott A. Rogers
*Attorney, Agent, or Firm*—Fitzpatrick, Cella, Harper & Scinto

[57] ABSTRACT

A method for supplying a viscous substance includes providing a viscous substance capable of changing its adhesiveness corresponding to the polarity of a voltage to be applied thereto; supplying the viscous substance between a pair of electrodes; and applying a pulse voltage between the pair of electrodes thereby to attach to at least one of the pair of electrodes the viscous substance of which amount corresponds to the effective duration factor of the pulse voltage.

12 Claims, 4 Drawing Sheets

METHOD AND APPARATUS FOR SUPPLYING A SUBSTANCE BETWEEN ELECTRODES, THE VISCOUS ADHESIVENESS OF WHICH IS REDUCED AT ONE ELECTRODE TO ATTACH A VARIABLE AMOUNT OF SUBSTANCE TO THE OTHER ELECTRODE ACCORDING TO THE DURATION OF AN APPLIED PULSE VOLTAGE

FIELD OF THE INVENTION AND RELATED ART

The present invention relates to a method of supplying a viscous or adhesive substance, and an image forming method and an image forming apparatus utilizing the same.

Hitherto, in a case where a viscous substance such as ink and adhesive is supplied to a printing plate or an adherent surface, the amount of the viscous substance to be supplied thereto is regulated by controlling the clearance between an ink fountain roller and an ink fountain blade (or bottom plate), rotation angle of the ink fountain roller rotating intermittently, movement of an ink ductor roller, etc.

However, in the above-mentioned conventional method, since the amount of the viscous substance to be supplied is mechanically controlled, there is a certain limit to the miniaturization of a device used therefor or reduction in noise produced therefrom. Further, in the conventional method, craftmanship or craftman sense is required in order to regulate the amount of the supply without the influence of an environmental change, i.e., a change in temperature and/or humidity, and therefore it is difficult to practice a maintenance-free mode.

Previously proposed has been a viscous substance-supplying method which is capable of constantly providing a suitable amount of viscous substance without the influence of a change in environmental conditions (U.S. patent application Ser. No. 413,472 corresponding to Japanese Patent Application No. 250168/1988).

On the other hand, the technique using such a viscous substance may also include printing. A printing process has been proposed wherein a voltage is applied to an ink so as to change its adhesiveness, whereby a recording is effected (U.S. patent application Ser. No. 499,579. A printing process has also been proposed wherein an ink remaining in the device used therefor is easily removed (U.S. Pat. No. 4,972,200).

SUMMARY OF THE INVENTION

An object of the present invention is to provide a viscous substance-supplying method which is capable of constantly providing a suitable amount of a viscous substance with little noise without the influence of a change in environmental conditions, and is further capable of regulating the supply amount of the viscous substance.

Another object of the present invention is to provide an image forming method and an image forming apparatus wherein a suitable amount of an ink may be supplied to a printing plate with little noise without the influence of a change in environmental conditions, and the supply amount of the ink may be regulated.

According to the present invention, there is provided a method for supplying a viscous substance, comprising:

providing a viscous substance capable of changing its adhesiveness corresponding to the polarity of a voltage to be applied thereto;

supplying the viscous substance between a pair of electrodes; and applying a pulse voltage between the pair of electrodes thereby to attach to least one of the pair of electrodes the viscous substance of which amount corresponds to the effective duration factor of the pulse voltage.

The present invention also provides an image forming method, comprising:

providing an ink capable of changing its adhesiveness corresponding to the polarity of a voltage applied thereto;

supplying the ink between a pair of electrodes;

applying a pulse voltage between the pair of electrodes thereby to attach the ink to at least one of the pair of the electrodes;

supplying the ink attached to the at least one electrode to a printing plate having a pattern of ink receptivity; and transferring the ink from the printing plate to a transfer-receiving medium to form thereon an ink image corresponding to the pattern of the ink receptivity.

The present invention further provides an image forming apparatus, comprising:

a pair of electrodes;

means for supplying an ink between the pair of electrodes;

a power supply for applying a pulse voltage between the pair of electrodes; and a printing plate having a pattern of ink receptivity;

whereby the ink attached to at least one of the pair of electrodes is supplied to the printing plate to form thereon an ink pattern corresponding to the pattern of ink receptibility.

These and other objects, features and advantages of the present invention will become more apparent upon a consideration of the following description of the preferred embodiments of the present invention taken in conjunction with the accompanying drawings.

DETAILED DESCRIPTION OF THE INVENTION

The viscous substance-supplying method according to the present invention may utilize a property of a viscous substance such that when a voltage is applied thereto by means of a pair of electrodes, the viscous substance having an adhesiveness is caused to have a non-adhesiveness (or reduces its adhesiveness) to one of the electrodes.

Hereinbelow, the present invention is described with reference to the accompanying drawings.

Figure 1:
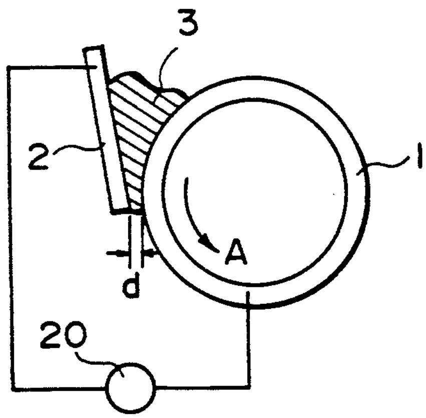
FIG. 1 is a schematic side sectional view showing an embodiment of the device for practicing the viscous substance-supplying method according to the present invention.

Referring to FIG. 1, one electrode 1 of a pair of electrodes 1 and 2 has a cylindrical shape. The other electrode 2 has a flat plate-like shape. The cylindrical electrode 1 is driven by a driving device (not shown) so that it is rotatable in the direction of arrow A.

Referring to FIG. 1, the electrodes 1 and 2 comprise an electroconductive material. Examples thereof may include: metals such as aluminum, copper, stainless steel, platinum, gold, chromium, nickel, and phosphor bronze; carbon; electroconductive rubbers and electroconductive polymers; and dispersions obtained by dispersing metal filler, etc., in various polymers.

Figure 2:
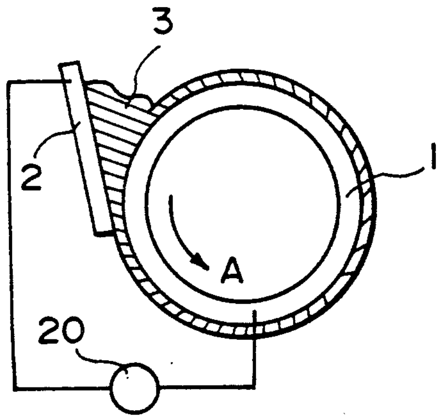
FIG. 2 is a schematic side sectional view of the device shown in FIG. 1, to which no voltage is applied.

Referring to FIG. 1, a viscous substance 3 is supplied between the electrodes 1 and 2, and the electrode 1 is rotated in the directions of arrow A, in a state where no voltage is applied between the electrodes 1 and 2. At this time, the viscous substance 3 adheres to the peripheral surface of the electrode 1 so as to provide a substantially uniform layer, as shown in FIG. 2.

Figure 3:
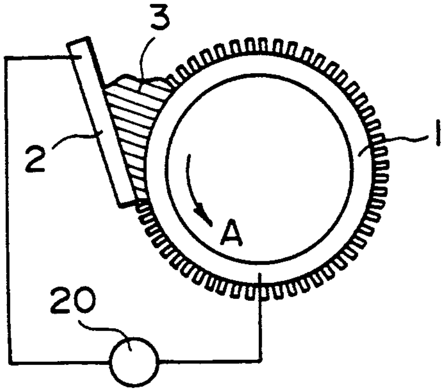
FIG. 3 is a schematic side sectional view of the device shown in FIG. 1, to which a voltage is applied.

Then, referring to FIG. 3, in a case where a pulse voltage is applied between the electrodes 1 and 2 by means of a power supply 20, when the potential of the electrode 1 becomes negative with respect to that of the electrode 2, the viscous substance 3 reduces its adhesiveness so that it becomes non-adhesive to the electrode 1. On the other hand, when the potential difference between the electrodes 1 and 2 becomes 0 (zero) or the potential of the electrode 1 with respect to that of the electrode 2 becomes positive, the viscous substance 3 adheres to the electrode 1. As a result, as shown in FIG. 3, the viscous substance 3 intermittently adheres to the peripheral surface of the electrode 1 corresponding to the waveform (or waveshape) of the pulse voltage applied between the electrodes 1 and 2.

Accordingly, when the rotating speed of the electrode 1 is constant, the amount of the viscous substance 3 to be disposed on the electrode 1 may easily be controlled in a simple and quiet manner by regulating the effective duration factor (e.g., duty) of the pulse voltage.

Figure 10:
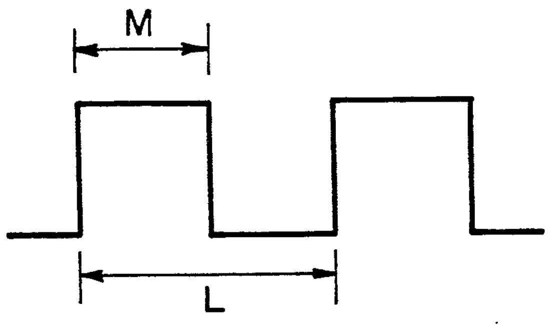
FIGS. 10–12 are graphs each showing an embodiment of the waveform or waveshape of a pulse voltage usable in the present invention.

Referring to FIG. 10, the effective duration factor used herein ma be represented by the following formula:

$$\text{effective duration factor} = M/L \times 100,$$

wherein M denotes the duration (or width) of one pulse, and L denotes the pulse period (or width of one period) of a repetitive pulse voltage. In a case where the pulse voltage comprises a rectangular wave (or square wave), the above-mentioned effective duration factor is equivalent to the duty (or duty factor) of the rectangular wave.

More specifically, for example, in a case where the amount of the viscous substance 3 supplied onto the electrode 1 is represented by "100 wt. parts" under conditions such that the pulse voltage comprises a continuous pulse having a constant frequency and a effective duration factor of 50, the supply amount of the viscous substance 3 is 150 wt. parts when the effective duration factor is 25, and the supply amount is 50 when the effective duration factor is 75.

In a case where the frequency of the pulse is changed while the effective duration factor thereof is constant, the supply amount of the viscous substance is not changed but the interval between the viscous substance pieces or stripes disposed on the electrode 1 is changed corresponding to the frequency of the pulse voltage.

In the present invention, the pulse voltage may preferably comprise a rectangular wave, but the waveform thereof is not particularly restricted. More specifically, the pulse voltage may also comprise a triangular wave, a sine wave, or another wave.

The pulse voltage may preferably be a voltage of 1–100 V, more preferably 5–80 V, in terms of the difference between the peak region (top magnitude) and the bottom (base magnitude) of the pulse voltage. If the voltage is below 1 V, the change from an adhesive state to a non-adhesive state may be insufficient. If the voltage exceeds 100 V, the power consumption undesirably becomes large. It is not necessarily easy to define a preferred frequency (or period) of the pulse voltage in a single way, but the frequency may preferably be such that it provides an interval of 5 mm or shorter, more preferably 2 mm or shorter, between the viscous substance pieces (or stripes) disposed on the electrode 1, with respect to the rotating direction of the electrode 1. The period of the pulse voltage may be either constant or variable.

Figure 11:
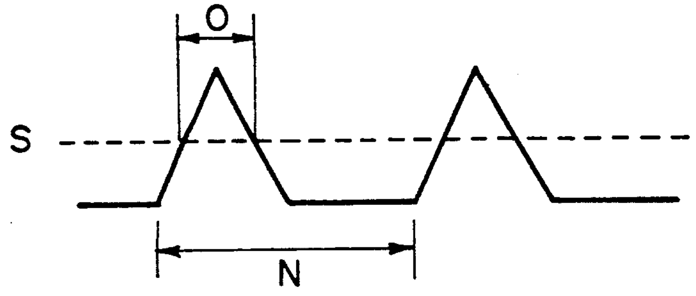
Figure 12:
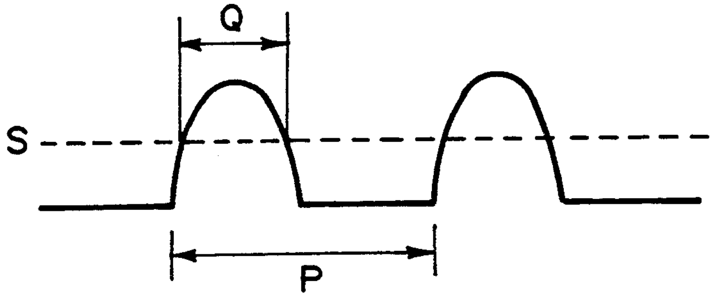

In an embodiment wherein the pulse voltage has another waveform such as triangular wave as shown in FIG. 11, or sine wave as shown in FIG. 12, the effective duration factor may be determined in consideration of a threshold voltage at which a viscous substance is changed from an adhesive state to a non-adhesive state.

More specifically, in the present invention, it is supposed that the non-adhesiveness of the viscous substance is developed corresponding to the amount of electric charge passing through the viscous substance, when a voltage is applied between a pair of electrodes. Accordingly, in the present invention, when the voltage to be applied to the viscous substance is gradually raised, the adhesion between the viscous substance and an electrode is gradually decreased corresponding to the applied voltage, and the viscous substance becomes non-adhesive to the electrode when the applied voltage exceeds a predetermined value (i.e., a threshold).

Accordingly, in the case of the triangular wave as shown in FIG. 11, the viscous substance becomes non-adhesive to the electrode corresponding to a region represented by 0 wherein the applied voltage is higher than a threshold S, as shown in FIG. 11. Thus, the region 0 shown in FIG. 11 corresponds to the region M in the case of the rectangular wave as shown in FIG. 10. As a result, in the case of the triangular wave, the effective duration factor may be defined as O/N ×100, wherein N denotes the width (or length) of one period.

In the case of a sine wave as shown in FIG. 12, the effective duration factor may be defined in the same manner as described above. More specifically, the effective duration factor may be defined as Q/P ×100, wherein P denotes the width of one period, and Q denotes the width of a region wherein the applied voltage is higher than a threshold S.

In addition, in a case where the pulse voltage has a waveform other than rectangular, triangular and sine waves, the effective duration factor may be defined as B/A ×100, wherein A denotes the width of one period, and B denotes the width of a region wherein the applied voltage is higher than a threshold S, in consideration of the threshold S.

In practice, however, the threshold S may be changed corresponding to the physical property of the viscous substance (e.g., electric resistance), the material (or electric resistance) of an electrode, etc. Accordingly, in general, the threshold S cannot be determined by the waveform of a pulse voltage to be applied to the viscous substance. For example, in a case where the viscous substance such as ink is changed, the threshold S may be changed corresponding to such a change, even when the same pulse voltages are used in combination therewith.

In the present invention, however, the effective duration factor of a pulse voltage may easily be confirmed by observing the state of the viscous substance intermittently attached to an electrode. More specifically, the width or duration of one period of the pulse voltage may be determined by observing the period of repetition of the viscous substance intermittently attached to an electrode.

Further, the range of a pulse voltage exceeding the threshold S may be determined by the width of the gap or clearance between the viscous substance pieces (or stripes) intermittently attached to the electrode (i.e., the width of a portion of the electrode not provided with the viscous substance). Accordingly, the above-mentioned effective duration factor of (B/A×100) may be confirmed by determining the following value:

[(width of gap between viscous substance stripes disposed on electrode)/(one period of viscous substance stripes disposed on electrode)]×100

The effective duration factor of the pulse voltage to be used in the present invention may preferably be 10–90, more preferably 30–70.

The clearance d between the electrodes 1 and 2 may preferably be 5 mm or smaller, more preferably 1 mm or smaller. When an elastic or elastomeric material such as electroconductive rubber is used in the electrode 1, it is possible that d=0 mm. When both of the electrodes 1 and 2 comprise rigid members, it is preferred to dispose these electrodes so that they do not contact each other.

When the viscous substances 3 attached to the electrode 1 is utilized, a suitable amount of the viscous substance 3 may constantly be obtained.

Figure 4:
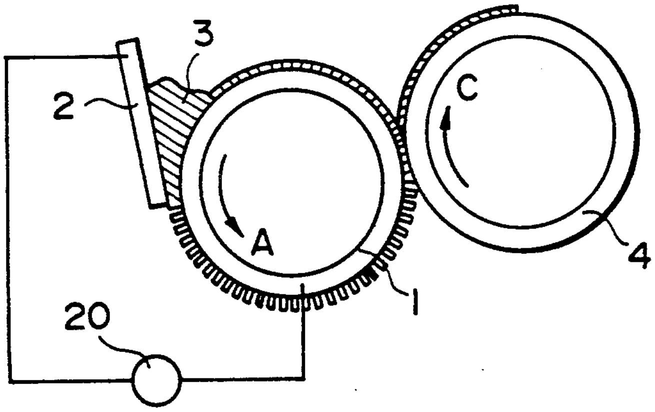
FIG. 4 is a schematic side sectional view showing a modification of the device shown in FIG. 1 which further includes a smoothing member.

In the present invention, when the viscous substance 3 attached to the electrode 1 is used, a means for uniformizing or smoothing the thickness of the viscous substance 3 attached to the electrode 1 may be used, as desired. For example, as shown in FIG. 4, a smoothing member 4 such as blade or roller may be caused to contact the viscous substance 3 attached to the electrode 1. Such a smoothing member 4 may be vibrated as desired.

The smoothing member 4 may comprise an elastic or elastomeric material such as silicone rubber, or a metal such as aluminum, copper, and stainless steel, etc., but may preferably comprise a rubber having a rubber hardness of 50–100 degrees, more preferably 60–90 degrees. When a roller is used as the smoothing member, the surface portion thereof may comprise a rubber.

Further, the smoothing member 4 may be vibrated in the direction parallel to the rotation axis of the electrode 1, e.g., by means of a magnet such as voice coil, or by mechanical means such as cam.

When a roller is used as the smoothing member 4, the smoothing member 4 may be driven so that it has a relative velocity to the electrode 1 or 2, with respect to their peripheral speeds. Further, the smoothing member 4 in the form of a roller may be intermittently rotated by means of a stepping motor, etc.

In an embodiment as shown in FIG. 4, a uniform layer of the viscous substance 3 may be provided either on the electrode 1 or on the electrode 4. Accordingly, each of the thus obtained uniform viscous substance layers may be used for a subsequent step such as printing step as described hereinafter.

In the embodiment described above with reference to FIGS. 1 to 3, the adhesiveness of the viscous substance 3 on the cathode side is decreased. In the present invention, however, the adhesiveness of a viscous substance on the anode side can be decreased depending on the kind of the viscous substance.

Figure 5:
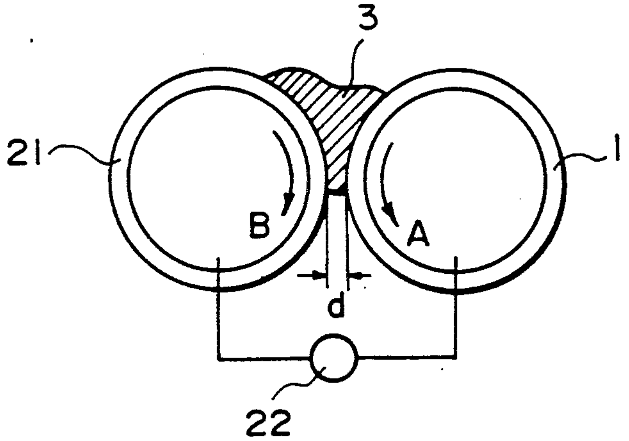
FIG. 5 is a schematic side sectional view showing another embodiment of the device for practicing the viscous substance-supplying method according to the present invention.
Figure 6:
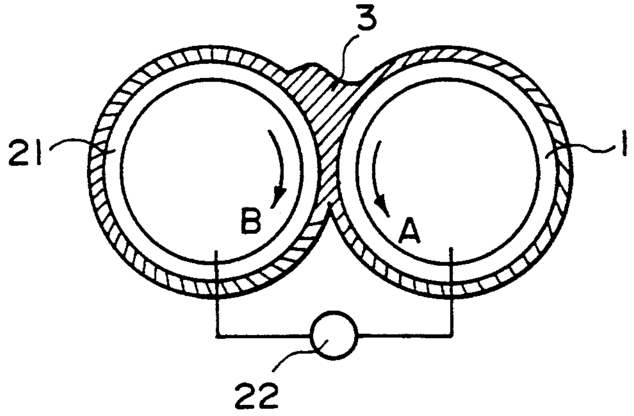
FIG. 6 is a schematic side sectional view of the device shown in FIG. 5, to which no voltage is applied.
Figure 7:
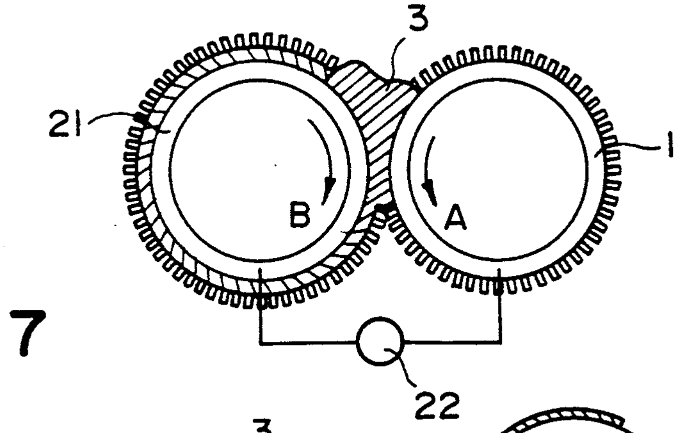
FIG. 7 is a schematic side sectional view of the device shown in FIG. 5, to which a voltage is applied.

Further, as shown in FIGS. 5 to 7, a cylindrical electrode 21 which is the same as the electrode 1 may be used instead of the plate-like electrode 2 as shown in FIG. 1. In such an embodiment, the electrode 21 may be rotated in the arrow B direction, which is counter to the rotating direction of the electrode 1. In FIGS. 5 to 7, reference numeral 22 denotes a power supply.

Figure 8:
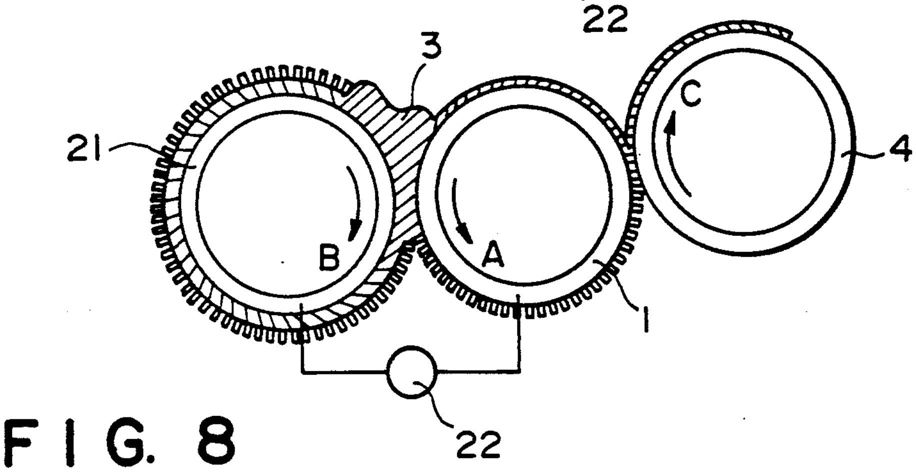
FIG. 8 is a schematic side sectional view showing a modification of the device shown in FIG. 5, which further includes a smoothing member.

FIG. 8 shows a device which further comprises a smoothing member 4, in addition tot he members constituting the device shown in FIG. 7. Hereinbelow, there will be described a viscous substance to be used in the viscous substance-supplying method according to the present invention.

In the present invention, there may be utilized some embodiments as follows, with respect to the mechanism wherein a viscous substance is converted from an adhesive state into a non-adhesive state under the application of a voltage.

(1) An embodiment wherein the adhesiveness of a viscous substance is changed on the basis of Coulomb force under voltage application.

In such an embodiment, an ink basically comprising inorganic or organic fine particles and a solvent may be used, and the ink may be converted from an adhesive state to a non-adhesive state by utilizing a difference in chargeability of the fine particles.

More specifically, in a case where the viscous substance may be prepared so that negatively chargeable fine particles (i.e., those capable of being easily charged negatively) are contained in the viscous substance, the viscous substance on the cathode side becomes non-adhesive to the cathode when a voltage is applied to the viscous substance. In a case where a viscous substance is prepared so that positively chargeable fine particles (i.e., those capable of being easily charged positively) are contained in the viscous substance, the viscous substance on the anode side becomes non-adhesive to the anode when a voltage is applied to the viscous substance.

(2) An embodiment wherein a viscous substance is subjected to electrolysis to generate a gas on the basis of electric conduction due to voltage application, whereby the adhesiveness of the viscous substance is changed.

In such an embodiment, a viscous substance may be prepared so that it is caused to generate a gas in the neighborhood of one electrode under voltage application, whereby the viscous substance becomes non-adhesive to the electrode due to the gas.

When a solvent such as water, alcohol and glycol; or a solvent containing an electrolyte such as sodium chloride and potassium chloride dissolved therein, is contained in the viscous substance, the viscous substance is caused to generate a gas due to electrolysis. The electric resistance of the viscous substance may preferably be as low as possible. More specifically, the volume resistivity of the viscous substance may preferably be $10^5$ ohm·cm or below, more preferably $10^4$ ohm·cm or below. If the volume resistivity exceeds $10^5$ ohm·cm, the quantity of electric conduction becomes too small, or a high voltage is required in order to prevent a decrease in the quantity of electric conduction.

In the present invention, it may be considered that the mechanism of the change in the ink from an adhesive state to a non-adhesive state is either one of the above-mentioned two mechanisms (1) and (2). It is possible that the mechanism of the viscous substance-supplying method according to the present invention is a combination of the above-mentioned mechanism (1) and (2).

Incidentally, with respect to the a portion of an ink layer supplied with a pulse voltage, almost the whole ink layer along the thickness direction may be transferred to a prescribed electronconductive member (hereinafter such transfer of an ink is referred to as "bulk transfer").

If the viscous substance used in the present invention is a liquid having a low viscosity such as water and alcohol, the cohesive force is weak, whereby it is difficult to obtain a suitable adhesiveness.

More specifically, the viscous substance used in the present invention may preferably satisfy at least one of the following properties.

(1) Adhesiveness

A sample of the viscous substance (reflection density: 1.0 or larger) is caused to adhere to a stainless steel plate of 1 cm×1 cm in size coated with platinum plating which is vertically disposed, so that a 2 mm-thick viscous substance layer is formed on the stainless steel plate, and is left standing as it is for 5 sec in an environment of a temperature of 25° C. and a moisture of 60%. Then, the height of the viscous substance layer is measured. Through the measurement, the viscous substance used in the present invention may preferably be held on the stainless steel plate substantially. More specifically, the above-mentioned height of the viscous substance layer may preferably be 50% or more, more preferably 80% or more, based on the original height thereof.

(2) Adhesiveness under no voltage application

A 2 mm-thick layer of a sample of the viscous substance is sandwiched between two stainless steel plates each of 1 cm×1 cm in size coated with platinum plating which are vertically disposed, and the stainless steel plates are separated from each other at a peeling speed of 5 cm/sec under no voltage application. Then, the areas of both plates covered with the viscous substance are respectively measured. Through the measurement, in the viscous substance used in the present invention, the respective plates may preferably show substantially the same adhesive amount of the viscous substance. More specifically, each plate may preferably show an area proportion of 0.7–1.0, in terms of the proportion of the area measured above to the area of the plate which has originally been covered with the above-mentioned 2 mm-thick viscous substance layer.

(3) Adhesiveness under voltage application

A sample viscous substance (reflection density: 1.0 or larger) is applied on a stainless steel plate of 1 cm×1 cm coated with platinum plating to form an about 2 mm-thick viscous substance layer, and another stainless steel plate coated with platinum plating having the same size as described above is, after the reflection density thereof is measured, disposed on the viscous substance layer, and these two stainless steel plates are vertically disposed. Then, a voltage of +30 V was applied between the above-mentioned two stainless steel plates sandwiching the 2 mm-thick viscous substance layer, while one of the stainless steel plates is used as a cathode (earth) and the other is used as an anode. The stainless steel plates are separated from each other at a peeling speed of 5 cm/sec in an environment of a temperature of 25° C. and a moisture of 60%, while applying the voltage in the above-mentioned manner, and then the reflection density of each stainless steel plate surface is measured to determine the increase in reflection density of the stainless steel plate. Through the measurement, in the viscous substance used in the present invention, it is preferred that the coloring content of the viscous substance is not substantially transferred to one of the above-mentioned two electrodes, and the viscous substance selectively adheres to the other electrode. More specifically, with respect to the electrode to which substantially no viscous substance adheres, the increase in the reflection density may preferably be 0.3 or smaller, more preferably 0.1 or smaller, when the above-mentioned viscous substance per se has a reflection density of 1.0 or larger.

When the viscous substance adhesiveness of the viscous substance is changed due to Coulomb force, charged or chargeable fine particles may be used as the entirety or a part of the above-mentioned fine particles and are mixed or kneaded in a liquid dispersion medium as described hereinafter, e.g., by means of a homogenizer, a colloid mill or an ultrasonic dispersing means, whereby charged particles are obtained.

The "charged particle" used herein refers to a particle which has a charge prior to the kneading. The "chargeable particle" refers to a particle which can easily be charged by triboelectrification.

Examples of the particles to be supplied with a positive charge may include: particles of a metal such as Au, Ag and Cu; particles of a sulfide such as zinc sulfide ZnS, antimony sulfide $Sb_2S_3$, potassium sulfide $K_2S$, calcium sulfide CaS, germanium sulfide GeS, cobalt sulfide CoS, tin sulfide SnS, iron sulfide FeS, copper sulfide $Cu_2S$, manganese sulfide MnS, and molybdenum sulfide $Mo_2S_3$; particles of a silicic acid or salt thereof such as orthosilicic acid $H_4SiO_4$, metasilicic acid $H_2SiO_3$, mesodisilicic acid $H_2Si_2O_5$, mesotrisilicic acid $H_4Si_3O_8$, mesotetrasilicic acid $H_6Si_4O_{11}$; polyamide resin particles; polyamide-imide resin particles; etc.

Examples of the particles to be supplied with a negative charge may include: iron hydroxide particles, aluminum hydroxide particles, fluorinated mica particles, polyethylene particles, montmorillonite particles fluorine-containing resin particles, etc.

Further, polymer particles containing various charge-controlling agents used as electrophotographic toners (positively chargeable or negatively chargeable) may be used for such a purpose.

The above-mentioned fine particles may generally have an average particle size of 100 microns or smaller, preferably 0.1–20 microns, more preferably 0.1–10 microns. The fine particles may generally be contained in the viscous substance in an amount of 1 wt. part or more, preferably 3–90 wt. parts, more preferably 5–60 wt. parts, per 100 wt. parts of the viscous substance.

Examples of the solvent contained in the viscous substance according to the present invention may include: ethylene glycol, propylene glycol, diethylene glycol, triethylene glycol, tetraethylene glycol, polyethylene glycol (weight-average molecular weight: about 100–1,000), ethylene glycol monomethyl ether, ethylene glycol monoethyl ether, ethylene glycol monobutyl ether, methyl carbitol, ethyl carbitol, butyl carbitol, ethyl carbitol acetate, diethyl carbitol, triethylene glycol monomethyl ether, triethylene glycol monoethyl ether, propylene glycol monomethyl ether, glycerin, triethanolamine, formamide dimethylformamide, dimethylsulfoxide N-methyl-2-pyrrolidone, 1,3-dimethylimidazolidinone, N-methylacetamide, ethylene carbonate, acetamide, succinonitrile, dimethylsulfoxide, sulfolane, furfuryl alcohol, N,N-dimethylformamide, 2-ethoxyethanol, hexamethylphosphoric amide, 2-nitropropane, nitroethane, γ-butyrolaotone, propylene carbonate 1,2,6-hexanetriol, dipropylene glycol, hexylene glycol, etc. These compounds may be used singly or as a mixture of two or more species as desired. The solvent may preferably be contained in an amount of 40–95 wt. parts, more preferably 60–85 wt parts, per 100 wt. parts of the viscous substance.

In an embodiment of the present invention, in order to control the viscosity of the viscous substance, a polymer soluble in the above-mentioned solvent may be contained in an amount of 1–90 wt. parts, more preferably 1–50 wt. parts, particularly preferably 1–20 wt. parts, per 100 wt. parts of the viscous substance.

Examples of such a polymer include: plant polymers, such as guar gum, locust bean gum, gum arabic, tragacanth, carrageenah, pectin, mannan, and starch; microorganism polymers, such as xanthane gum, dextrin, succinoglucan, and curdran; animal polymers, such as gelatin, casein, albumin, and collagen; cellulose polymers such as methyl cellulose, ethyl cellulose, and hydroxyethyl cellulose; starch polymers, such as soluble starch, carboxymethyl starch, and methyl starch; alginic acid polymers, such as propylene glycol alginate, and alginic acid salts; other semisynthetic polymers, such as derivatives of polysaccharides; vinyl polymers, such as polyvinyl alcohol, polyvinylpyrolidone, polyvinyl methyl ether, carboxyvinyl polymer, and sodium polyacrylate; and other synthetic polymers, such as polyethylene glycol, ethylene oxide-propylene oxide block copolymer; alkyd resin, phenolic resin, epoxy resin, aminoalkyd resin, polyester resin, polyurethane resin, acrylic resin, polyamide resin, polyamide-imide resin, polyester-imide resin, and silicone resin; etc. These polymers may be used singly or in mixture of two or more species, as desired. Further, there can also be used grease such as silicone grease, and liquid polymer such as polybutene.

In a case where the adhesiveness of the viscous substance is changed by the generation of a gas due to electrolysis, the solvent may preferably comprise: water, an alcohol such as methanol and ethanol; a solvent having a hydroxyl group such as glycerin, ethylene glycol and propylene glycol; or a solvent wherein an electrolyte such as sodium chloride and potassium chloride is dissolved. The amounts of the solvent and fine particles to be contained in the viscous substance are the same as those described above.

Particularly, when water or an aqueous solvent is used as the solvent, hydrogen gas is liable to be generated at the cathode side. When water and another solvent are mixed, the water content may preferably be 1 wt. part or more, more preferably 5–99 wt. parts, per 100 wt. parts of the viscous substance.

In the case of the viscous substance capable of generating a gas due to electrolysis, the viscous substance can also contain fine particles of, e.g., silica, carbon fluoride, titanium oxide or carbon black, in addition to those described hereinabove.

In a preferred embodiment of the viscous substance usable in the present invention, in view of the viscoelastic characteristic of the viscous substance, the entirety or a part of the fine particles comprise swelling particles (i.e., particles capable of being swelled) which are capable of retaining the above-mentioned solvent therein.

Examples of such swelling particles may include: fluorinated mica such as Na-montmorillonite, Ca-montmorillonite, 3-octahedral synthetic smectites, Na-hectorite, Li-hectorite, Na-taeniolite, Na-tetrasilicic mica and Li-taeniolite; synthetic mica, silica, etc.

The above-mentioned fluorinated mica may be represented by the following general formula (1).

$$W_{1-\frac{1}{3}}(X,Y)_{2.5-3}((Z_4O_{10})F_2 \quad (1),$$

wherein W denotes Na or Li; X and Y respectively denote an ion having a coordination number of 6, such as $Mg^{2+}$, $Fe^{2+}$, $Ni^2$, $Mu^{2+}$, $A1^{3+}$, and $Li^+$; Z denotes a positive ion having a coordination number of 4 such as $Al^{3+}$, $Si^{4+}$, $Ge^{4+}$, $Fe^{3+}$, $B^{3+}$ or a combination of these including, e.g., $(Al^{3+}/Si^{4+})$.

The swelling particles, in their dry state, may preferably have an average particle size of 0.1–20 microns, more preferably 0.8–15 microns, particularly preferably 0.8–8 microns. The swelling particle content can be the same as that described above with respect to the fine particles, but may more preferably be 8–60 wt. parts per 100 wt. parts of the viscous substance. It is also preferred to use swelling particles having charges on their surfaces.

The viscous substance-supplying method according to the present invention may be used in a step of supplying an ink to a printing plate in the art of printing. In such a case, the ink corresponds to the above-mentioned viscous substance.

The ink used herein may be obtained by incorporating a colorant in the above-mentioned viscous substance. The colorant may comprise a dye or pigment generally used in the field of printing or recording, such as carbon black. The colorant content may preferably be 0.1–40 wt. parts, more preferably 1–20 wt. parts, per 100 wt. parts of the ink. Instead of or in combination with the colorant, a color-forming compound capable of generating a color under voltage application can be contained in the ink.

Figure 9:
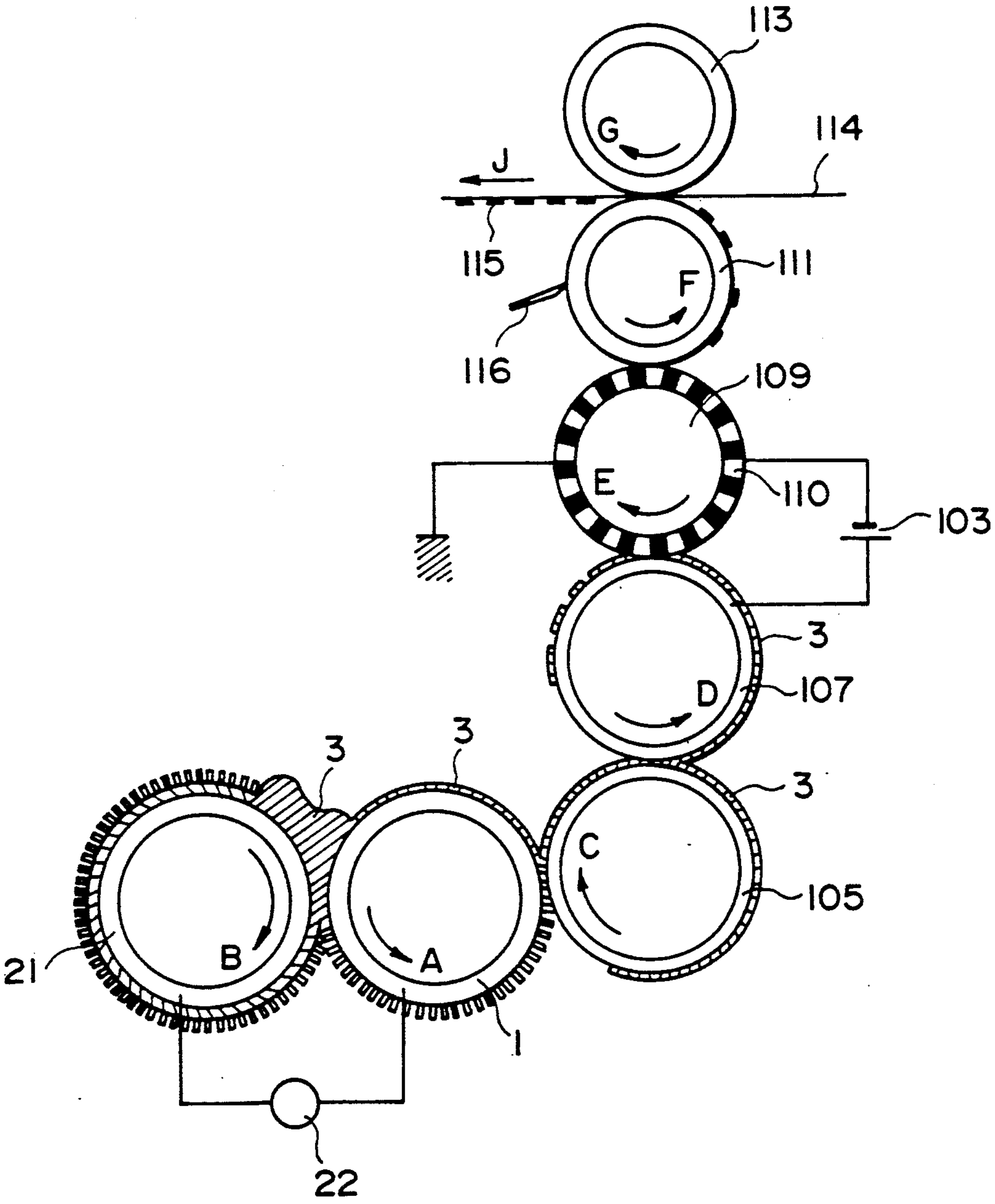
FIG. 9 is a schematic side sectional view showing an embodiment of the image forming apparatus according to the present invention.

FIG. 9 shows an embodiment of the printing apparatus utilizing the viscous substance (ink)supplying method according to the present invention. Referring to FIG. 9, in such an apparatus, a suitable amount of a viscous substance 3 is provided to a first intermediate roller 105 rotating in the arrow C direction by an ink amount control means according to the present invention comprising electrodes 1 and 21. The first intermediate roller 105 used in such an embodiment comprises an elastomeric material such as silicone rubber, and the roller 105 is rotated at a peripheral speed lower than that of the electrode 1 while contacting the electrode 1.

The first intermediate roller 105 as shown in FIG. 9 may also function as a smoothing roller. Accordingly, in the embodiment as shown in FIG. 9, the ink 3 transferred to the first intermediate roller 105 forms an ink layer having a substantially uniform thickness. The first intermediate roller 105 can also comprise a metal such as aluminum, copper and stainless steel, in addition to the above-mentioned elastomeric material such as silicone rubber.

In contact with the layer of the ink 3 formed on the first intermediate roller 105, there is disposed a second intermediate roller 107 rotating in the arrow D direction so that it contacts the ink layer 3, whereby an ink layer is formed on the surface of the second intermediate roller 107. The second intermediate roller 107 may preferably comprise an electroconductive material such as an electroconductive rubber, and a metal including aluminum, copper, stainless steel, etc.

In contact with the ink layer 3 formed on the second intermediate roller 107, there is disposed a printing plate 110 wound about a plate roller 109 rotating in the arrow E direction. A portion of the ink layer disposed on the second intermediate roller 107 is transferred to the printing plate 110 corresponding to the image portion of the printing plate 110, thereby to form thereon an ink pattern. The printing plate 110 may be known one such as those for offset printing, gravure printing, letterpress printing, etc.

Further, the printing plate 110 can be one comprising an electroconductive portion and an insulating portion. In such a case, for example, a voltage may be applied between the printing plate 110 and the second intermediate roller 107 by means of an electric power supply 103 to convert the ink 3 to a non-adhesive state at the electroconductive portion of the plate 110, whereby the ink 3 is selectively attached to the insulating portion thereof.

The thus formed ink pattern formed on the printing plate 110 is then transferred to a blanket cylinder 111, which rotates in the arrow F direction while contacting the printing plate 110 under pressure. Further, the ink pattern disposed on the blanket cylinder 111 is transferred to a recording medium (or a medium to be recorded) 114 such as a sheet of paper, cloth or metal, moving in the arrow J direction and passing between the blanket cylinder 111 and an impression cylinder 113, which rotates in the arrow G direction while contacting the blanket cylinder 111 under pressure, whereby an image 115 corresponding to the above-mentioned ink pattern is formed on the recording medium 114.

It is also possible that the ink pattern formed on the printing plate 110 is directly transferred to the recording medium 114 in some cases without providing the blanket cylinder 111. However, when the blanket cylinder 111 is provided, an image having the same pattern as that of the printing plate 110 may be obtained on the recording medium 114.

In FIG. 9, cleaning means 116 such as a blade is disposed, as desired, so that it contacts the peripheral surface of the blanket cylinder 111. The cleaning means 116 may scrape the remaining ink from the peripheral surface of the blanket cylinder 111.

Hereinbelow, the present invention will be explained in more detail with reference to Examples.

EXAMPLE 1

An adhesive was used as a viscous substance and the supply of the adhesive was effected by means of a device as shown in FIG. 1.

The adhesive used herein was one prepared in the following manner.

30 g of gum arabic powder (mfd. by Showa Kagaku K.K.) was added to 200 g of glycerin and stirred under heating at 80° C. so that the gum arabic was dissolved in the glycerin. After the resultant solution was cooled to room temperature, 140 g of lithium taeniolite ($LiMg_2Li(Si_4O_{10})F_2$) having an average particle size of 2.5 microns was added thereto and kneaded in a homogenizer at $10^5$ rpm for 30 min. Thereafter, 200 g of water was added to the resultant product and mixed by means of a roll mill to prepare an adhesive comprising a gray colloid sol in the form of an amorphous solid.

In the device as shown in FIG. 1, the adhesive 3 prepared above was supplied to the clearance between the electrodes 1 and 2, and then the electrode 1 was rotated in the directions of the arrow A at a peripheral speed of 18 mm/sec., while no voltage was applied therebetween. As a result, the adhesive 3 was applied onto the electrode 1 to form thereon a substantially uniform coating, as shown in FIG. 2.

The electrode 1 used herein comprised a stainless steel roller having a diameter of 34 mm and a width of 80 mm, and was rotatable in the arrow A direction on the basis of a motor (not shown). The electrode 2 comprised a 2 mm-thick stainless steel plate coated with platinum plating, and the surface of the plate confronting the electrode 1 except for a 3 mm-wide lower edge portion thereof was covered with a teflon tape so that the resultant covered portion was insulating. Further, the gap (or clearance) d between the electrodes 1 and 2 was 0.5 mm.

After the adhesive was applied onto the peripheral surface of the electrode 1 to form thereon a substantially uniform coating, the rotation of the electrode 1 was stopped and a portion of the adhesive coating corresponding to half of the entire peripheral surface of the electrode 1 was completely removed from the electrode 1 by means of a plastic spatula. When the thus removed adhesive was weighed, the weight thereof was about 4.5 g.

Then, the above-mentioned procedure was repeated so that the state as shown in FIG. 1 was resumed, and the electrode 1 was rotated in the arrow A direction at 18 mm/sec, while a continuous rectangular pulse of +30 V (frequency =2 Hz, duty =50) was applied between the electrode 1 as a cathode and the electrode 2 as an anode. As a result, the adhesive was attached to the electrode 1 in the form of stripes corresponding to the above-mentioned rectangular pulse, as shown in FIG. 3.

In such a state, the rotation of the electrode 1 and the voltage application were stopped and a portion of the adhesive coating corresponding to half of the entire peripheral surface of the electrode 1 was completely removed from the electrode 1 by means of a plastic spatula. When the thus removed adhesive was weighed, the weight thereof was about 2.4 g.

The above procedure was repeated except that the duty of the pulse voltage was changed to 25 while the voltage and frequency thereof were not changed, and the weight of the adhesive attached to the electrode 1 was measured in the same manner as described above.

As a result, the thus measured weight of the adhesive was about 1.1 g.

As described above, the supply amount of the adhesive could be changed so as to provide a ratio of about 1:1/2:1/4, by changing the duty of the pulse voltage.

EXAMPLE 2

The supply of an adhesive was conducted in the same manner as in Example 1 except for using an adhesive which had been prepared in the following manner.

250 g of a polyvinyl pyrrolidone (K-30, mfd. by Kishida Kagaku K.K. was added to a mixture liquid comprising 100 g of glycerin and 200 g of water, and the resultant mixture was heated at about 80° C. under stirring to dissolve the polyvinyl pyrrolidone in the mixture liquid. The resultant solution was then cooled to room temperature and 35 g of lithium borofluoride (mfd. by Kishida Kagaku K.K.) was added thereto to dissolve it in the above-mentioned solution, whereby an adhesive was prepared.

When the thus prepared adhesive was used, the supply amount thereof could be changed by changing the duty of the pulse voltage, in the same manner as in Example 1.

EXAMPLE 3

The supply of an adhesive was conducted by using the same adhesive as that used in Example 1, by means of a device as shown in FIG. 5.

Referring to FIG. 5, the electrode 1 was the same as that used in Example 1. The electrode 21 used herein comprised a stainless steel roller having a diameter of 34 mm and a width of 80 mm coated with platinum plating. Further, the gap (or clearance) d between the electrodes 1 and 21 was 0.2 mm.

When the above-mentioned adhesive was supplied between the electrodes 1 and 21, and these electrodes were rotated in the directions of the arrows A and B, respectively (i.e., so as to provide rotating directions reverse to each other), the adhesive was applied onto both of the surfaces of the electrodes 1 and 21 so as to form thereon substantially uniform coatings. Both of the peripheral speeds of the electrodes 1 and 21 were 18 mm/sec.

In such a state, the rotations of the electrodes 1 and 21 were stopped and a portion of the adhesive coating corresponding to half of the entire peripheral surface of the electrode 1 was weighed in the same manner as in Example 1. The thus measured weight of the adhesive was about 0.9 g.

Then, in the same manner as in Example 1, the electrodes 1 and 21 were rotated in the respective directions which were reverse to each other, while a continuous rectangular pulse of +30 V (frequency 2 Hz, duty =50) was applied between the electrode 1 as a cathode and the electrode 21 as an anode. As a result, the adhesive was attached to both of these electrodes 1 and 21 in the form of stripes corresponding to the above-mentioned rectangular pulse, as shown in FIG. 7.

In such a state, the rotation of the electrodes and 21 and the voltage application were stopped and a portion of the adhesive coating corresponding to half of the entire peripheral surface of the electrode 1 was completely removed from the electrode 1 by means of a plastic spatula. When the thus removed adhesive was weighed, the weight thereof was about 0.4 g.

Thus, the amount of the adhesive supplied to the electrode 1 was changed to ½ of that under no voltage application by using the pulse voltage of a duty of 50.

Thereafter, the above procedure was repeated except that both of the peripheral speeds of the electrodes 1 and 21 was 9 mm/sec. The results were as follows:

| | weight of adhesive* |
|---|---|
| No electric conduction | about 0.9 g |
| 30 V, 2 Hz, duty 50 | about 0.4 g |
| 30 V, 2 Hz, duty 25 | about 0.7 g |

*The weight of the adhesive disposed on half of the peripheral surface of the electrode.

As described above, when the peripheral speeds of the electrodes 1 and 21 were reduced, the intervals of the stripes of the adhesive formed on the electrode 1 were shortened, but the supply amount of the adhesive could be regulated corresponding to the duty of the pulse voltage applied thereto.

EXAMPLE 4

The supply of an ink was conducted by using the same device as that used in Example 1.

The ink used herein was one prepared in the following manner.

200 g of glycerin and 140 g of lithium taeniolite ($LiMg_2Li(Si_4O_{10})F_2$) having an average particle size of 2.5 microns were kneaded in a homogenizer at $10^5$ rpm for 30 min., and then 200 g of water was added thereto and mixed by means of a roll mill to prepare a gray colloid sol ink in the form of an amorphous solid.

When the supply of the above-mentioned ink was conducted under no voltage application in the same manner as in Example 1, the ink was applied onto the peripheral surface of the electrode 1 to form thereon a substantially uniform coating. At this time, the weight of a portion of the ink coating corresponding to half of the entire peripheral surface of the electrode 1 was about 4.5 g.

Then, while a continuous rectangular pulse of +30 V (frequency 100 Hz, duty =50) was applied between the electrode 1 as a cathode and the electrode 2 as an anode, the supply of the ink was conducted in the same manner as in Example 1. As a result, the ink was attached to the electrode 1 in the form of stripes corresponding to the above-mentioned rectangular pulse, as shown in FIG. 3. When the weight of the ink disposed on the electrode 1 was measured, the weight thereof was about 2.4 g.

The above procedure was repeated except that the duty of the pulse voltage was changed to 75 while the voltage and frequency thereof were not changed, and the weight of the ink attached to the electrode 1 was measured in the same manner as described above. As a result, the thus measured weight of the adhesive was about 1.1 g.

As described above, the supply amount of the ink could be changed so as to provide a ratio of about 1:1/2:1/4, by changing the duty of the pulse voltage.

After the ink was attached to the electrode 1 in a state as shown in FIG. 3, a silicone rubber roller 4 (diameter =34 mm, width =80 mm, rotating speed =15 mm/sec) as an ink smoothing means rotating in the arrow C direction (i.e., the rotating direction reverse to that of the electrode 1) was caused to contact the electrode 1, whereby a uniform ink layer was formed on the electrode 1 downstream of the contact position between the electrode 1 and the roller 4, as shown in FIG. 4. At this time, a uniform ink layer was simultaneously formed on the silicone rubber roller 4. In this instance, each of the ink layers formed on the electrode 1 and roller 4 could be used for the subsequent printing step.

EXAMPLE 5

The supply of an ink was conducted by using the same device as that used in Example 3. The ink used herein was the same as in Example 4.

When the supply of the above-mentioned ink was conducted under no voltage application in the same manner as in Example 3, the ink was applied onto the peripheral surfaces of both of the electrodes 1 and 21 to form thereon substantially uniform coatings, respectively. At this time, the weight of a portion of the ink coating corresponding to half of the entire peripheral surface of the electrode 1 was about 0.9 g.

Then, while a continuous rectangular pulse of +30 V (frequency 5 Hz, duty =50) was applied between the electrode 1 as a cathode and the electrode 21 as an anode, the supply of the ink was conducted in the same manner as in Example 3. As a result, the ink was attached to both of the electrodes 1 and 21 in the form of stripes corresponding to the above-mentioned rectangular pulse, as shown in FIG. 7. When the weight of the ink disposed on the electrode 1 was measured in the same manner as in Example 3, the weight thereof was about 0.4 g.

Thus, the amount of the ink supplied to the electrode 1 was changed to ½ of that under no voltage application by using the pulse voltage of a duty of 50.

Thereafter, the above procedure was repeated except that both of the peripheral speeds of the electrodes 1 and 21 was 9 mm/sec. The results were as follows:

| | weight of ink* |
|---|---|
| No electric conduction | about 0.9 g |
| 30 V, 5 Hz, duty 50 | about 0.4 g |
| 30 V, 5 Hz, duty 25 | about 0.7 g |

*The weight of the ink disposed on half of the peripheral surface of the electrode.

As described above, when the peripheral speeds of the electrodes 1 and 21 were reduced, the intervals of the stripes of the ink formed on the electrode 1 were shortened, but the supply amount of the ink could be regulated corresponding to the duty of the pulse voltage applied thereto.

Thereafter, in the same manner as in Example 4, a silicone rubber roller 4 (diameter =34 mm, width =80 mm, rotating speed =7 mm/sec) as an ink smoothing means rotating in the arrow C direction (i.e., the rotating direction reverse to that of the electrode 1) was caused to contact the electrode 1, whereby results similar to those obtained in Example 4 were obtained as shown in FIG. 8.

EXAMPLE 6

Printing was conducted by using a printing apparatus as shown in FIG. 9.

Referring to FIG. 9, the electrodes 1 and 21 were the same as those used in Example 4. Both of the peripheral speeds of the electrodes 1 and 21 were 18 mm/sec, and the clearance between the electrodes 1 and 21 was 0.2 mm.

The first intermediate roller 105 was a 34 mm-diameter roller comprising silicone rubber and was disposed so that it contacted the electrode 1. The first intermediate roller 105 was rotated at a peripheral speed of 15 mm/sec.

The second intermediate roller 107 was a 30 mm-diameter cylindrical roller comprising a surface layer of an electroconductive rubber. The second intermediate roller 107 was rotated at a peripheral speed of 15 mm/sec.

The plate roller 109 comprised a 30 mm-diameter cylindrical roller of iron hard chromium plating. Around the plate roller 109, a printing plate 110 comprising an aluminum plate and an image pattern of a photohardenable vinyl-type resin disposed thereon was wound.

More specifically, the pattern used herein was obtained by exposing a 50 micron-thick laminate n(trade name: Laminar HM Dry Film, mfd. by Motron Thiokol Inc., Dynachem Division) to light by means of a mercury (UV) lamp in a light quantity of 60 mJ/cm$^2$, and developing the thus exposed laminate with a 1%-aqueous $Na_2CO_3$ solution at 26° C. The plate roller 109 was rotated at a peripheral speed of 15 mm/sec. The second intermediate roller 107 was disposed so that it contacted both of the first intermediate roller 105 and the printing plate 110. Further, the blanket roller 111 had a diameter of 40 mm and comprised an aluminum roller and a silicone rubber layer wound about the surface of the aluminum roller. The blanket roller 111 was rotated at a peripheral speed of 15 mm/sec.

In such a printing apparatus as shown in FIG. 9, printing was effected on plain paper by supplying an ink 3 between the electrodes 1 and 21. At this time, a continuous rectangular pulse of +30 V (10 Hz, duty =50) was applied between the electrode 1 as a cathode and the electrode 21 as an anode by means of a power supply 22, and a DC voltage of +25 V was applied between the second intermediate roller 107 as an anode and the plate roller 109 as a cathode by means of a power supply 103. The ink 3 used herein was one obtained by incorporating 10 wt. % of carbon black in the ink used in Example 4.

As a result, the ink 3 was supplied to the printing plate 110 in an amount corresponding to the duty of the pulse voltage, and the ink 3 is selectively attached to the insulating portion of the printing plate 110, whereby an image 115 was formed on plain paper 114.

When the above-mentioned printing procedure was repeated except that the duty of the pulse voltage was changed to 75, the amount of the ink 3 supplied to the printing plate 110 became 1.5 times that obtained above.

As described hereinabove, according to the present invention, the amount of a viscous substance such as ink and adhesive to be supplied to an electrode may be regulated or controlled by changing the effective duration factor (e.g., duty) of a pulse voltage applied to the electrode, without the influence of temperature and/or humidity.

What is claimed is:

1. A method for supplying a viscous substance, said method comprising the steps of:

providing a viscous substance having a decreasing viscous adhesiveness at one of a pair of electrodes when the viscous substance is supplied with a voltage having a predetermined polarity between the pair of electrodes;

supplying the viscous substance between the pair of electrodes;

applying a pulse voltage between the pair of electrodes to thereby attach to at least one of the pair of electrodes the viscous substance, the amount of viscous substance attaching to the at least one electrode varying as a function of an effective duration factor of the pulse voltage; and smoothing or making uniform the thickness of the viscous substance attached to at least one of the pair of electrodes.

2. A method according to claim 1, wherein the viscous substance reduces its adhesiveness of a cathode side of the electrode pair.

3. A method according to claim 1, wherein the viscous substance reduces its adhesiveness on an anode side of the electrode pair.

4. A method according to claim 1, wherein the pair of electrodes comprises a flat plate and a roller.

5. A method according to claim 1, wherein the pair of electrodes comprises rollers.

6. An image forming method, said method comprising the steps of:

providing a viscous ink having a decreasing viscous adhesiveness at one of a pair of electrodes when the viscous substance is supplied with a voltage having a predetermined polarity between the pair of electrodes;

supplying the ink between the pair of electrodes;

applying a pulse voltage between the pair of electrodes to thereby attach the ink to at least one of the pair of the electrodes;

smoothing or making uniform the thickness of the ink attached to at least one of the pair of electrodes;

supplying the ink attached to the at least one electrode to a printing plate having a pattern of ink receptivity; and transferring to the ink from the printing plate to a transfer-receiving medium to form thereon an ink image corresponding to the pattern of the ink receptivity.

7. A method according to claim 6, wherein the printing plate has a pattern comprising an electroconductive portion and an insulating portion, and is supplied with a voltage.

8. A method according to claim 6, wherein the viscous substance reduces its adhesiveness on a cathode side of the electrode pair.

9. A method according to claim 6, wherein the viscous substance reduces its adhesiveness on an anode side of the electrode.

10. An image forming apparatus, comprising:

a pair of electrodes;

means for supplying an ink between the pair of electrodes;

a power supply for applying a pulse voltage between the pair of electrodes so as to attach the ink to at least one of the pair of electrodes;

a smoothing member for smoothing or making uniform the thickness of the ink attached to at least one of the pair of electrodes; and a printing plate having a pattern of ink receptivity;

whereby the ink attached to at least one of the pair of electrodes is supplied to the printing plate to form thereon an ink pattern corresponding to the pattern of ink receptivity.

11. An apparatus according to claim 10, further comprising a power supply for applying a voltage to the printing plate the pattern of said printing plate comprising an electroconductive portion and an insulating portion.

12. An apparatus according to claim 10, wherein said pair of electrodes comprise rollers.

* * * * *

UNITED STATES PATENT AND TRADEMARK OFFICE

CERTIFICATE OF CORRECTION

PATENT NO. : 5,138,345

DATED : August 11, 1992

INVENTOR(S) : NOBORU TOHYAMA, ET AL.

It is certified that error appears in the above-identified patent and that said Letters Patent is hereby corrected as shown below:

COLUMN 1:

Line 44, "Ser. No. 499,579." should read --Ser. No. 499,579).--.

COLUMN 2:

Line 35, "receptibility." should read --receptivity.--.

COLUMN 3:

Line 30, "directions" should read --direction--;
Line 57, "ma" should read --may--.

UNITED STATES PATENT AND TRADEMARK OFFICE
CERTIFICATE OF CORRECTION

PATENT NO. : 5,138,345 Page 2 of 5

DATED : August 11, 1992

INVENTOR(S) : NOBORU TOHYAMA, ET AL.

It is certified that error appears in the above-identified patent and that said Letters Patent is hereby corrected as shown below:

COLUMN 4:

Line 5, "a" (second occurrence) should read --an--;

Line 58, "0" should read --O--;

Line 60, "0" should read --O--.

COLUMN 5:

Line 52, "substances 3" should read --substance 3--.

COLUMN 6:

Line 33, "tot he" should read --to the--.

COLUMN 7:

Line 25, "mechanism (1)" should read --mechanisms (1)--;

Line 26, "the" should be deleted.

UNITED STATES PATENT AND TRADEMARK OFFICE
CERTIFICATE OF CORRECTION

PATENT NO. : 5,138,345 Page 3 of 5

DATED : August 11, 1992

INVENTOR(S) : NOBORU TOHYAMA, ET AL.

It is certified that error appears in the above-identified patent and that said Letters Patent is hereby corrected as shown below:

COLUMN 8:

Line 63, "particles fluo-" should read --particles, fluo- --.

COLUMN 9:

Line 25, "γ-butyrolaotone," should read --γ-butyrolactone,--;

Line 40, "carrageenah," should read --carrageenin,--.

COLUMN 10:

Line 29, "$W_{1-1/3}(X,Y)_{2.5-3}((Z_4O_{10})F_2$ (1)," should read --$W_{1-1/3}(X,Y)_{2.5-3}(Z_4O_{10})F_2$ (1),--;

Line 62, "(ink)supplying" should read --(ink)-supplying--.

COLUMN 12:

Line 22, "directions" should read --direction--.

UNITED STATES PATENT AND TRADEMARK OFFICE
CERTIFICATE OF CORRECTION

PATENT NO. : 5,138,345

DATED : August 11, 1992

INVENTOR(S) : NOBORU TOHYAMA, ET AL.

It is certified that error appears in the above-identified patent and that said Letters Patent is hereby corrected as shown below:

COLUMN 13:

Line 12, "Kagaku K.K." should read --Kagaku K.K.)--;

Line 61, "electrodes and 21" should read --electrodes 1 and 21--.

COLUMN 16:

Line 9, "iron hard" should read --iron coating with hard--.

COLUMN 17:

Line 11, "of" should read --on--.

UNITED STATES PATENT AND TRADEMARK OFFICE

CERTIFICATE OF CORRECTION

PATENT NO. : 5,138,345

DATED : August 11, 1992

INVENTOR(S) : NOBORU TOHYAMA, ET AL.

It is certified that error appears in the above-identified patent and that said Letters Patent is hereby corrected as shown below:

COLUMN 18:

Line 14, "electrode." should read --electrode pair.--;

Line 32, "plate the" should read --plate, the--.

Signed and Sealed this

Twenty-first Day of December, 1993

Attest:

BRUCE LEHMAN

Attesting Officer

Commissioner of Patents and Trademarks